US010989317B2

(12) United States Patent
Doi et al.

(10) Patent No.: US 10,989,317 B2
(45) Date of Patent: Apr. 27, 2021

(54) TWO-WAY VALVE (71) Applicant: SMC Corporation, Chiyoda-ku (JP)

(72) Inventors: Yoshitada Doi, Koshigaya (JP); Yuzuru Okita, Tsukubamirai (JP); Takamitsu Suzuki, Joso (JP); Akinori Nagata, Tsukubamirai (JP)

(73) Assignee: SMC Corporation, Chiyoda-ku (JP)

( * ) Notice: Subject to any disclaimer, the term of this patent is extended or adjusted under 35 U.S.C. 154(b) by 0 days.

(21) Appl. No.: 16/543,768

(22) Filed: Aug. 19, 2019

(65) Prior Publication Data
US 2020/0063875 A1 Feb. 27, 2020

(30) Foreign Application Priority Data
Aug. 23, 2018 (JP) .............................. JP2018-155928

(51) Int. Cl.
F16K 7/16 (2006.01)
(52) U.S. Cl.
CPC ...................... F16K 7/16 (2013.01)
(58) Field of Classification Search
CPC ..... F16K 7/12; F16K 7/14; F16K 7/16; F16K 7/17; F16K 7/123; F16K 7/20; F16K 27/0236; F16K 31/0641; F16K 31/0672; F16K 31/52491; F16K 31/5288; F16K 99/0015
See application file for complete search history.

(56) References Cited

U.S. PATENT DOCUMENTS 4,057,072 A * 11/1977 Cook .................. F16K 17/0433
137/115.18
5,779,224 A 7/1998 Fukano et al.
2009/0101858 A1 * 4/2009 Pechtold ................... F16K 1/36
251/333
2013/0334449 A1 12/2013 Muci et al.
2015/0129791 A1 * 5/2015 Okita ........................ F16K 7/14
251/331
2015/0323081 A1 11/2015 Hasunuma
2019/0383423 A1 * 12/2019 Halstead .................. A01K 7/00

FOREIGN PATENT DOCUMENTS

| CN | 104500812 A | 4/2015 |
| JP | 3701367 B2 | 9/2005 |
| JP | 2015-215028 A | 12/2015 |

OTHER PUBLICATIONS

Extended European Search Report dated Jan. 16, 2020, in Patent Application No. 19192259.0, 9 pages.

* cited by examiner

Primary Examiner — Hailey K. Do
(74) Attorney, Agent, or Firm — Oblon, McClelland, Maier & Neustadt, L.L.P.

(57) ABSTRACT

A two-way valve configured to switch between a communication state and a non-communication state of between a primary port and a secondary port includes a valve body having the primary port and the secondary port and containing a valve seat portion therein, a diaphragm valve supported inside the valve body so as to be brought into contact with and separated from the valve seat portion, and a drive mechanism configured to displace the diaphragm valve. The diaphragm valve includes an annular projection facing a flat seat surface of the valve seat portion and an elastic member attached at the back of the annular projection.

11 Claims, 8 Drawing Sheets

TWO-WAY VALVE

CROSS-REFERENCE TO RELATED APPLICATIONS

This application is based upon and claims the benefit of priority from Japanese Patent Application No. 2018-155928 filed on Aug. 23, 2018, the contents all of which are incorporated herein by reference.

BACKGROUND OF THE INVENTION

Field of the Invention

The present invention relates to a two-way valve configured to switch between communication state and non-communication state of between a primary port and a secondary port, by displacement of a diaphragm valve.

Description of the Related Art

Heretofore, there have been known two-way valves including a valve body containing therein primary and secondary ports and a diaphragm valve, wherein the diaphragm valve is configured to open and close a communication path between the primary and secondary ports (for example, see Japanese Patent No. 3701367).

In such two-way valves, techniques for reducing impact caused when the diaphragm valve comes into contact with a valve seat portion are adopted to prevent particle production (for example, see Japanese Laid-Open Patent Publication No. 2015-215028). In a technique disclosed in Japanese Laid-Open Patent Publication No. 2015-215028, endless projections protrude from a valve seat portion toward a valve element surface of a diaphragm, and an elastic member is disposed at the back of the valve element surface of the diaphragm. According to the patent document, the impact caused when the diaphragm comes into contact with the valve seat portion is absorbed by the elastic member deformed together with the diaphragm coming into contact with the projections.

SUMMARY OF THE INVENTION

However, the valve element surface of the diaphragm described in Japanese Laid-Open Patent Publication No. 2015-215028 is formed into a thin film shape in order to be deformed easily, and may tear easily due to excessive stretches caused by repeated deformation along the shapes of the projections on the valve seat portion. Moreover, when excessive stretches including permanent deformation occur in the valve element surface, the projections on the valve seat portion may come into contact with the valve element surface at different positions, thereby causing particle production and a reduction in durability due to fluid leakage.

The present invention has been devised taking into consideration the aforementioned problems, and has the object of providing a two-way valve capable of preventing particle production caused by contact between a diaphragm valve and a valve seat portion and increasing durability of the diaphragm valve.

According to an aspect of the present invention, a two-way valve configured to switch between a communication state and a non-communication state of between a primary port and a secondary port, includes a valve body having the primary port and the secondary port and containing therein a valve seat portion, a diaphragm valve supported inside the valve body so as to be brought into contact with and separated from the valve seat portion, and a drive mechanism configured to displace the diaphragm valve. The diaphragm valve includes an annular projection facing a seat surface of the valve seat portion, the seat surface having a flat shape, and an elastic member attached at a back of the annular projection.

According to the two-way valve, impact caused by contact between the diaphragm valve and the valve seat portion is reduced by the elastic member, thereby suppressing particle production. In addition, the annular projection provided on the diaphragm valve comes into contact with the flat seat surface of the valve seat portion. This prevents local stretches in the diaphragm valve and thus increases the durability of the diaphragm valve.

In the two-way valve according to the present invention, the annular projection provided on the diaphragm valve comes into contact with the valve seat portion, and the impact caused by contact between the annular projection and the valve seat portion is absorbed and reduced by the elastic member attached at the back of the annular projection. As a result, no or few particles are produced. In addition, the annular projection provided on the diaphragm valve comes into contact with the flat seat surface of the valve seat portion. This prevents local stretches in the diaphragm valve, and thus prevents rupture or other damage to the diaphragm valve. As a result, the durability of the diaphragm valve is increased.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a two-way valve according to the present invention will be described in detail below with reference to the accompanying drawings. In the following description, directions of arrows A and B in FIG. 1 refer to vertical directions. That is, the direction of the arrow A refers to upward, and the direction of the arrow B refers to downward.

First Embodiment

A two-way valve 10 according to a first embodiment of the present invention will now be described with reference to FIGS. 1 to 5. The two-way valve 10 includes a body part 12 having a primary port 20 and a secondary port 22 formed therein, a bonnet 14 joined to an upper portion of the body part 12, a diaphragm valve 16, and a piston 18. The body part 12 and the bonnet 14 constitute the valve body.

Figure 1:
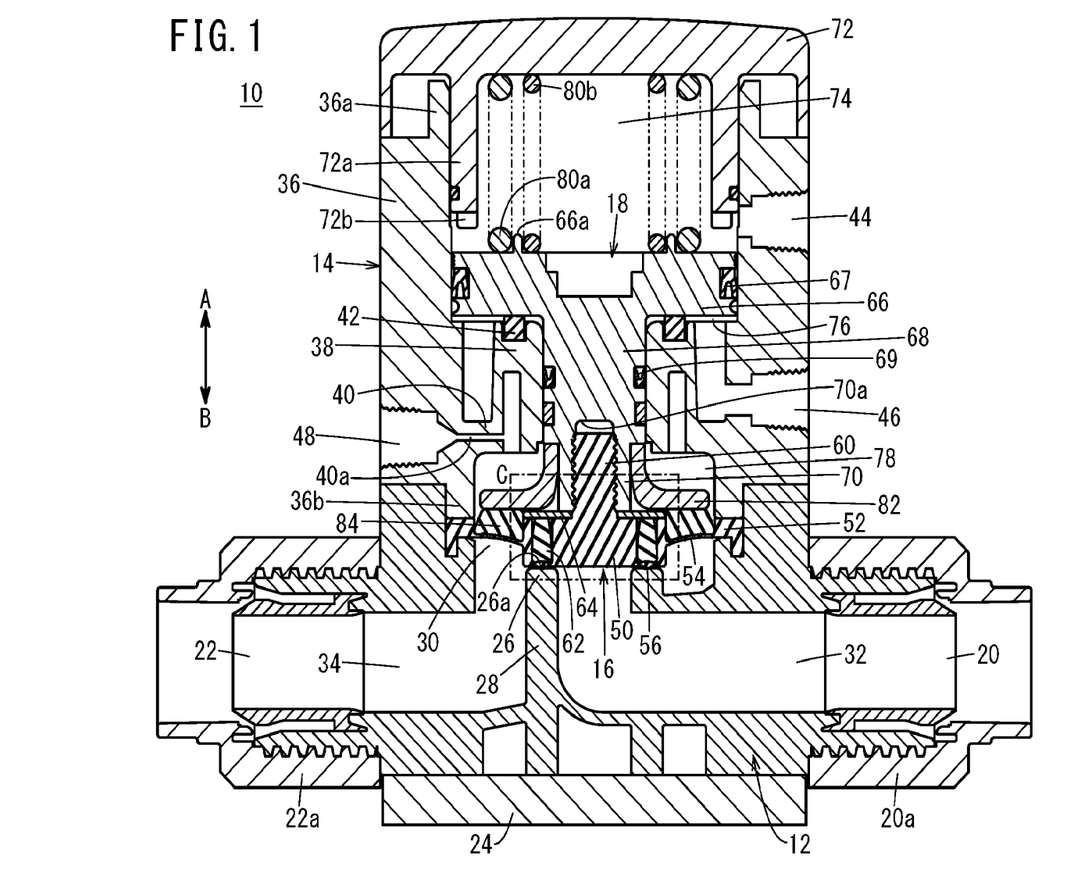
FIG. 1 is a longitudinal sectional view of a two-way valve according to a first embodiment of the present invention when the valve is closed.

The body part 12 is made of a metal material such as aluminum alloy or a resin material such as a fluororesin (e.g., PFA). In the body part 12, the primary port 20, into which pressurized fluid flows, and the secondary port 22, from which the pressurized fluid flows out, are coaxially aligned to face each other. A primary coupling 20a for tube connection is attached to the primary port 20, and thereby the primary port 20 is connected to a first pressurized fluid supply source (not illustrated) via a tube. A secondary coupling 22a for tube connection is attached to the secondary port 22, and thereby the secondary port 22 is connected to a fluid pressure device (e.g., hydraulic or pneumatic instrument) (not illustrated) via a tube. A base member 24 is used for installing the valve body.

The body part 12 includes an inner wall structure 28 including a valve seat portion 26 at an intermediate part between the primary port 20 and the secondary port 22. The upper surface of the valve seat portion 26 serves as a flat, annular seat surface 26a onto which the diaphragm valve 16 is seated, and faces an upper opening 30 formed in the body part 12. The seat surface 26a is preferably a smooth surface with less than or equal to a predetermined surface roughness. A primary channel 32 extending from the primary port 20 to the valve seat portion 26 contains a space on the inner side of the inner wall structure 28. A secondary channel 34 extending from the valve seat portion 26 to the secondary port 22 contains a space on the outer side of the inner wall structure 28. The primary channel 32 and the secondary channel 34 communicate with each other when the diaphragm valve 16 is separated from the seat surface 26a, and are isolated from each other when the diaphragm valve 16 is seated on the seat surface 26a.

The bonnet 14 has a double-walled tubular shape including an outer tubular portion 36 and an inner tubular portion 38. The inner tubular portion 38 extends upward from a connection portion 40 extending horizontally from a lower part of the outer tubular portion 36. A cylindrical damper member 42 is installed in an annular groove formed in an upper end part of the inner tubular portion 38, and part of the damper member 42 protrudes upward from the upper end surface of the inner tubular portion 38. The damper member 42 is made of, for example, a synthetic rubber and has a predetermined elasticity. The outer tubular portion 36 includes an upper annular protrusion 36a at an upper end part thereof and a lower annular protrusion 36b at a lower end part thereof.

A first port 44 and a second port 46 are formed in a side surface of the bonnet 14 and arranged vertically at an interval. The first port 44 is open to the atmosphere, while the second port 46 is connected to a second pressurized fluid supply source (not illustrated) via a tube. The second port 46 is located below the first port 44 and communicates with a space left between the outer tubular portion 36 and the inner tubular portion 38. A third port 48 is also formed in the side surface of the bonnet 14 at a height substantially identical to the height of the connection portion 40. The third port 48 is also open to the atmosphere.

The diaphragm valve 16 includes a body portion 50 that can be brought into contact with and separated from the seat surface 26a of the valve seat portion 26, an outer circumferential portion 52 supported by the valve body, and a thin-film diaphragm portion 54 connecting the body portion 50 and the outer circumferential portion 52. The body portion 50, the outer circumferential portion 52, and the diaphragm portion 54 are integrated with each other, and are made of, for example, synthetic resin such as polytetrafluoroethylene (PTFE) or an elastic body including natural rubber or synthetic rubber. The diaphragm valve 16 has a hardness lower than the hardness of the body part 12 including the valve seat portion 26.

Figure 2:
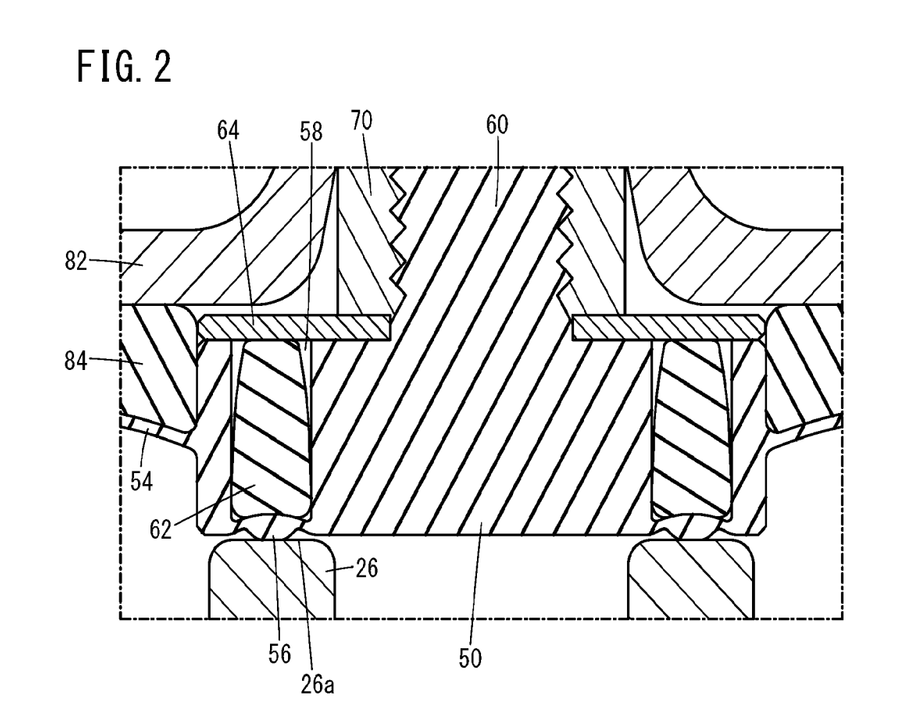
FIG. 2 is an enlarged view of a C part in FIG. 1.
Figure 4:
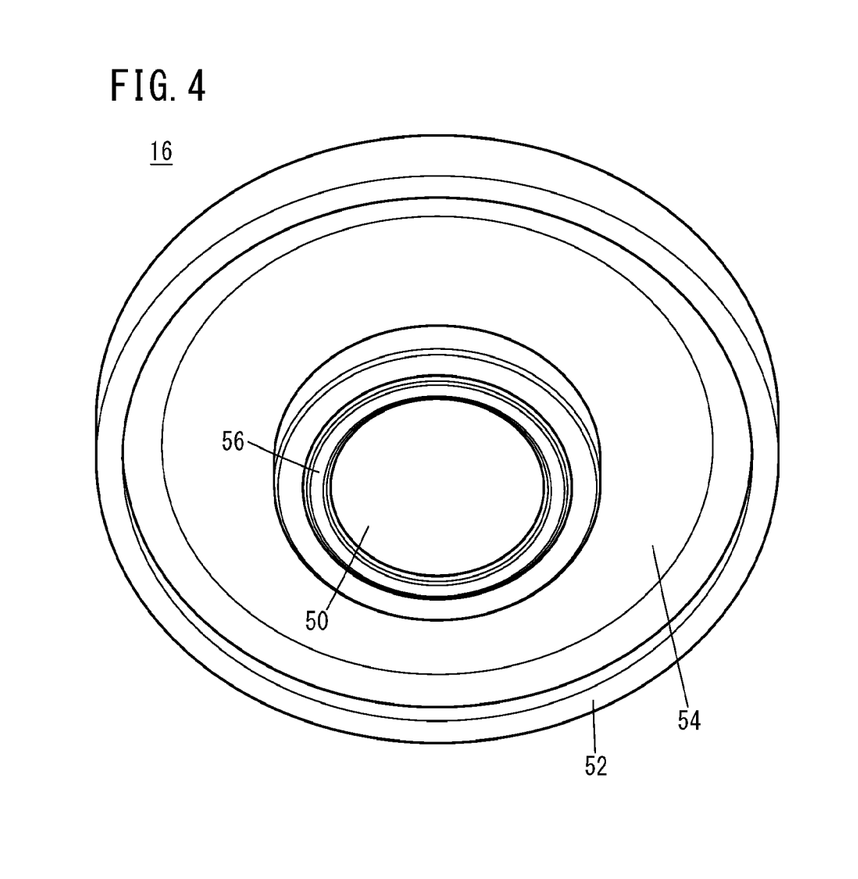
FIG. 4 is a perspective view of a diaphragm valve used in the two-way valve in FIG. 1 viewed from diagonally below.
Figure 5:
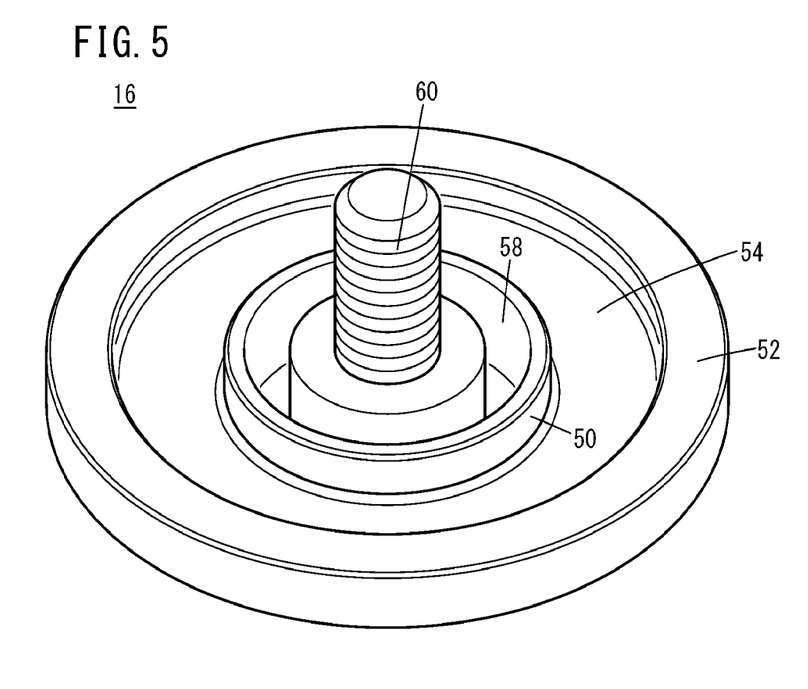
FIG. 5 is a perspective view of the diaphragm valve used in the two-way valve in FIG. 1 viewed from diagonally above.

As illustrated in FIGS. 2 and 4, an annular projection 56 with a semicircular or arc-shaped cross-section protrudes downward from the lower surface of the body portion 50 of the diaphragm valve 16 to face the flat seat surface 26a of the valve seat portion 26. As illustrated in FIGS. 2 and 5, an annular recess 58, which opens at the upper surface of the body portion 50, is formed at the back of the annular projection 56. Thus, the body portion 50 is thick-walled as a whole, however part of the body portion that lies at and near the annular projection 56 is thin-walled due to the presence of the annular recess 58, so that the body portion 50 is easily deformable in the vicinity of the annular projection 56. A connecting shaft 60 having an external thread part extends upward from the center of the upper surface of the body portion 50.

A cylindrical elastic member 62 with a predetermined elasticity is installed in the annular recess 58 of the body portion 50. The elastic member 62 is made of, for example, natural rubber or synthetic rubber such as NBR and urethane rubber. The elastic member 62 is held inside the annular recess 58 by a circular disk shaped retainer 64 attached to the upper surface of the body portion 50. Thus, the elastic member 62 elastically supports the back of the annular projection 56 and the thin-walled part of the body portion 50 in the vicinity of the annular projection 56.

In the natural state before being installed in the annular recess 58, the elastic member 62 has a vertical (axial) length substantially identical to the depth of the annular recess 58. The inner and outer circumferential surfaces of the cylindrical elastic member 62 are tapered surfaces inclined to be closer to each other with height. Thus, gaps increasing with height are left between the outer wall surface of the annular recess 58 and the outer circumferential surface of the elastic member 62 and between the inner wall surface of the annular recess 58 and the inner circumferential surface of the elastic member 62. This allows the elastic member 62 to be elastically deformed easily inside the annular recess 58 when the elastic member 62 is compressed in the axial direction. Furthermore, due to the large area at the lower part (bottom surface) thereof, the elastic member 62 can support the back of the annular projection 56 and the thin-walled part of the body portion 50 in the vicinity of the annular projection 56.

The bonnet 14 is attached to the body part 12 by fitting the lower annular protrusion 36b into the upper opening 30 of the body part 12. At this time, the outer circumferential portion 52 of the diaphragm valve 16 is held between the lower end surface of the lower annular protrusion 36b of the bonnet 14 and the body part 12. The diaphragm portion 54 of the diaphragm valve 16 bends by following displacement of the body portion 50 inside the valve body.

The piston 18 includes a large-diameter portion 66 fitted into the outer tubular portion 36 of the bonnet 14, a medium-diameter portion 68 fitted into the inner tubular portion 38 of the bonnet 14, and a small-diameter portion 70 joined to the diaphragm valve 16. A first seal member 67 is installed into a recessed groove formed in the outer circumferential surface of the large-diameter portion 66 of the piston 18 so as to be in sliding contact with the inner circumferential surface of the outer tubular portion 36 of the bonnet 14. A second seal member 69 is installed into a recessed groove formed in the outer circumferential surface of the medium-diameter portion 68 of the piston 18 so as to be in sliding contact with the inner circumferential surface of the inner tubular portion 38 of the bonnet 14.

The small-diameter portion 70 of the piston 18 has, formed therein, a screw hole 70a having an internal thread part and which opens downward. The diaphragm valve 16 is joined to the piston 18 by inserting and screwing the connecting shaft 60 of the body portion 50 into the screw hole 70a in the small-diameter portion 70 of the piston 18. At this time, the retainer 64 into which the connecting shaft 60 of the diaphragm valve 16 is inserted is held and sandwiched between the lower end surface of the small-diameter portion 70 of the piston 18 and the body portion 50 of the diaphragm valve 16.

A retaining member 82 with an L-shaped cross-section is attached to the outer circumference of the small-diameter portion 70 of the piston 18. An elastic support 84 is held and sandwiched between the lower surface of the retaining member 82 and the upper surface of the diaphragm portion 54. The elastic support 84 is made of, for example, natural rubber or synthetic rubber such as NBR and urethane rubber, and has a thick-walled ring shape. The elastic support 84 is displaceable in an integrated manner with the piston 18 and the diaphragm valve 16.

When the valve is open, the elastic support 84 has its natural shape or original shape (i.e., a shape when no load is applied) in which the outer circumferential surface is shifted downward in the axial direction with respect to the inner circumferential surface. An inner circumferential side of the upper surface of the elastic support 84 is in contact with the retaining member 82, and the entire lower surface of the elastic support is in surface contact with the diaphragm portion 54 (see FIG. 3). While the valve position changes from open to close, the outer circumference of the elastic support 84 is pressed upward by the diaphragm portion 54, so that the elastic support 84 is deformed. When the valve is closed, the entire upper surface of the elastic support 84 is in contact with the retaining member 82, and the entire lower surface is in surface contact with the diaphragm portion 54 (see FIG. 1). Thus, the elastic support 84 serves to restrict upward bending of the diaphragm portion 54 caused by the pressure of the fluid inside the secondary channel 34.

A cover body 72 is attached to the upper end part of the bonnet 14 by fitting a tubular protrusion 72a protruding from the lower surface of the cover body 72 into the upper annular protrusion 36a of the bonnet 14. The tubular protrusion 72a has, formed in a lower end thereof, a plurality of slits 72b radially extending.

The large-diameter portion 66 of the piston 18 provided with the first seal member 67 partitions the space inside the bonnet 14 into an upper cylinder chamber 74 and a lower cylinder chamber 76. The upper cylinder chamber 74 is exposed to the atmosphere via the first port 44. The lower cylinder chamber 76 includes a space left between the outer tubular portion 36 and the inner tubular portion 38 of the bonnet 14, and is connected to the second pressurized fluid supply source (not illustrated) via the second port 46. Pressurized fluid can be supplied from the second pressurized fluid supply source to the lower cylinder chamber 76 and can be discharged from the lower cylinder chamber 76 by operating a switching valve (not illustrated).

The bonnet 14, the diaphragm valve 16, and the piston 18 define a diaphragm chamber 78 above the diaphragm portion 54. The diaphragm chamber 78 is open to the atmosphere via a communicating hole 40a formed in the connection portion 40 of the bonnet 14 and the third port 48. Moreover, the diaphragm chamber 78 is sealed off from the primary channel 32 and the secondary channel 34 by the outer circumferential portion 52 of the diaphragm valve 16 being held and sandwiched between the lower annular protrusion 36b of the bonnet 14 and the body part 12. The lower cylinder chamber 76 is hermetically sealed from the diaphragm chamber 78 by the medium-diameter portion 68 of the piston 18 provided with the second seal member 69. The retaining member 82 and the elastic support 84 described above are disposed inside the diaphragm chamber 78.

Two coil springs 80a and 80b with different outer diameters are concentrically disposed inside the upper cylinder chamber 74. The coil springs 80a and 80b are disposed between the lower surface of the cover body 72 and the upper surface of the piston 18 and bias the piston 18 downward. The coil springs 80a and 80b are positioned in radial directions by an annular protruding part 66a disposed on the upper surface of the large-diameter portion 66 of the piston 18.

When pressurized fluid is not supplied to the lower cylinder chamber 76, the body portion 50 of the diaphragm valve 16 connected to the piston 18 in an integrated manner abuts against the seat surface 26a of the valve seat portion 26 at the annular projection 56 due to the elastic force of the coil springs 80a and 80b. That is, the diaphragm valve 16 functions as a normally closed valve.

The piston 18 is displaceable between the top dead center where the upper surface of the large-diameter portion 66 comes into abutment against the tubular protrusion 72a of the cover body 72 and the bottom dead center where the lower surface of the large-diameter portion 66 comes into abutment against the damper member 42 to compress the damper member 42 by a predetermined amount. The piston 18 connected to the diaphragm valve 16 and the structure for displacing the piston 18 upward and downward correspond to a drive mechanism for displacing the diaphragm valve 16.

Figure 3:
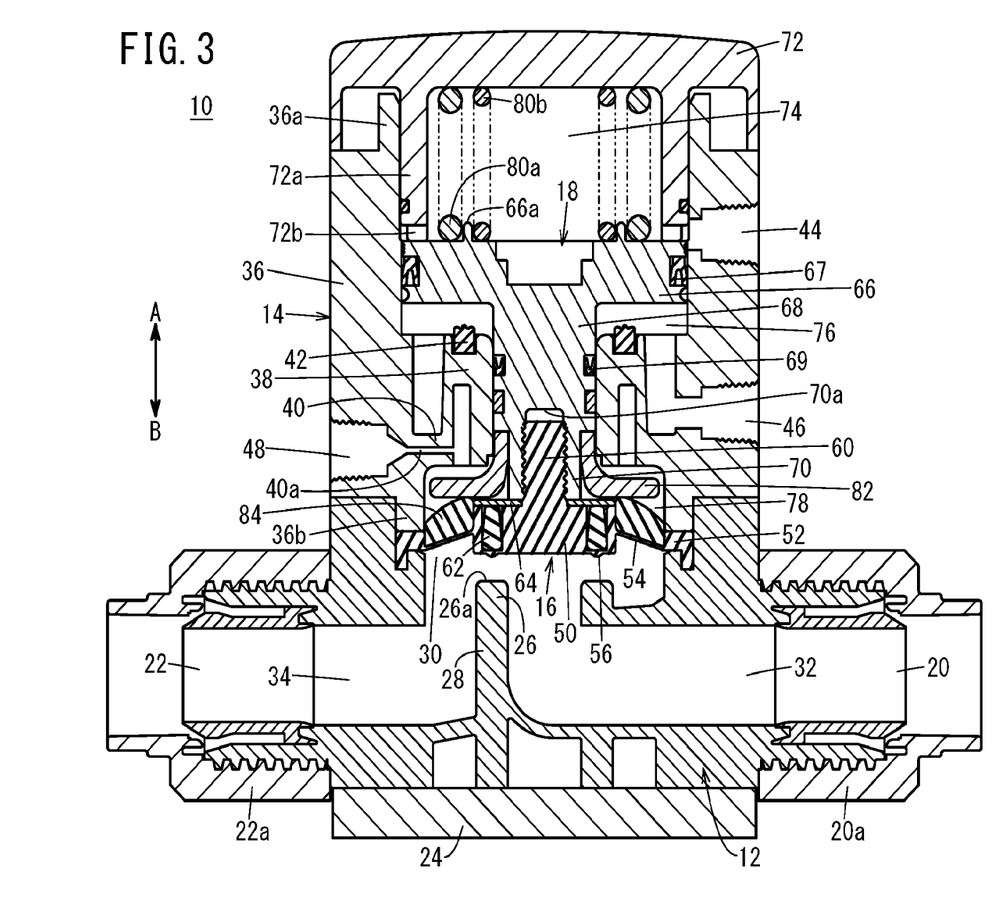
FIG. 3 is a longitudinal sectional view of the two-way valve in FIG. 1 when the valve is open.

The two-way valve 10 according to this embodiment is basically configured as above, and the operations thereof will be described below with reference to FIGS. 1 and 3.

The primary port 20 is connected to the first pressurized fluid supply source, and the secondary port 22 is connected to the fluid pressure device. At the same time, the second port 46 is connected to the second pressurized fluid supply source via the switching valve (not illustrated). The first port 44 and the third port 48 are open to the atmosphere at all times.

As illustrated in FIG. 1, at an initial position, the piston 18 is pressed downward by the elastic force of the coil springs 80a and 80b, and the annular projection 56 of the diaphragm valve 16 is seated on the seat surface 26a of the valve seat portion 26. Thus, the primary port 20 and the secondary port 22 do not communicate with each other (i.e., a non-communication state).

From this initial state, the switching valve (not illustrated) is operated to supply pressurized fluid from the second pressurized fluid supply source to the lower cylinder chamber 76 through the second port 46. Then, the fluid supplied to the lower cylinder chamber 76 presses the piston 18 upward by the pressure thereof. The piston 18 is displaced upward since the pressing force of the fluid is greater than the elastic force of the coil springs 80a and 80b. This causes the body portion 50 of the diaphragm valve 16 connected integrally to the piston 18 to be separated from the valve seat portion 26 and thus brings the primary port 20 and the secondary port 22 into communication with each other. As illustrated in FIG. 3, the piston 18 moves up until the large-diameter portion 66 comes into contact with the tubular protrusion 72a of the cover body 72. In this way, the valve is in an open state where the body portion 50 of the diaphragm valve 16 is at a position farthest from the valve seat portion 26.

While the primary port 20 and the secondary port 22 communicate with each other in this manner, pressurized fluid is supplied from the first pressurized fluid supply source to the primary port 20. The pressurized fluid supplied to the primary port 20 reaches the valve seat portion 26 through the primary channel 32. The pressurized fluid then passes through the gap between the seat surface 26a of the valve seat portion 26 and the body portion 50 of the diaphragm valve 16, and is supplied to the fluid pressure device through the secondary channel 34 and the secondary port 22.

When the switching valve is operated to expose the second port 46 to the atmosphere, the pressurized fluid supplied and accumulated in the lower cylinder chamber 76 is discharged to the outside. As a result, the elastic force of the coil springs 80a and 80b becomes the dominant force acting on the piston 18, and the piston 18 is displaced downward. The body portion 50 of the diaphragm valve 16 connected to the piston 18 is also displaced downward, and the annular projection 56 of the body portion 50 comes into abutment against the flat seat surface 26a of the valve seat portion 26. As a result, the valve is closed as in the initial state, and the communication between the primary port 20 and the secondary port 22 is shut off (see FIG. 1). At this time, the tip of the annular projection 56 with a semicircular or arc-shaped cross-section is in linear contact with the seat surface 26a, and thus the annular projection 56 is in contact with the seat surface 26a at a high surface pressure as much as possible. This results in a high sealing performance.

When the annular projection 56 of the body portion 50 comes into contact with the seat surface 26a of the valve seat portion 26, the annular projection 56 is pushed upward by the seat surface 26a, and the thin-walled part of the body portion 50 in the vicinity of the annular projection 56 is deformed to warp upward. The elastic member 62 disposed at the back of the annular projection 56 and the thin-walled part of the body portion 50 in the vicinity of the annular projection 56 is pushed upward and compressed in the axial direction between the retainer 64 and the back of the annular projection, so that the elastic member is elastically deformed.

In this case, the gaps left between the wall surfaces of the annular recess 58 and the tapered surfaces of the elastic member 62 allow the elastic member 62 to be deformed easily. The load (impact) which the annular projection 56 of the body portion 50 receives when the annular projection 56 comes into contact with the seat surface 26a of the valve seat portion 26 is transmitted from the large bottom surface of the elastic member 62 to the entire elastic member 62 in a distributed manner, and is effectively absorbed. In addition, no large stress acts locally on the thin-walled part of the body portion 50.

Since the impact caused when the body portion 50 comes into contact with the valve seat portion 26 is absorbed and reduced as described above, no or few particles are scraped off the body portion 50 which is lower in hardness than the valve seat portion 26, upon contact between the body portion 50 and the valve seat portion 26. Thus, incorporation of particles into the pressurized fluid flowing from the primary channel 32 to the secondary channel 34 is prevented. Moreover, since local stress concentration does not occur on the body portion 50, the body portion 50 is not damaged. The seat surface 26a of the valve seat portion 26 having a predetermined flat surface also contributes to elimination or reduction of particles.

The large-diameter portion 66 of the piston 18 abuts against the damper member 42 installed into the upper end part of the inner tubular portion 38 of the bonnet 14 slightly earlier than the annular projection 56 of the body portion 50 abuts against the seat surface 26a of the valve seat portion 26. The damper member 42 decelerates the piston 18 by the elastic effect thereof and limits downward displacement of the piston 18. The speed of the body portion 50 of the diaphragm valve 16 integrally connected to the piston 18 is also reduced, and the annular projection 56 of the body portion 50 abuts against the seat surface 26a of the valve seat portion 26 at the reduced speed. This further prevents particle production.

Second Embodiment

Next, a two-way valve 90 according to a second embodiment of the present invention will be described with reference to FIGS. 6 to 8. The second embodiment is different from the first embodiment in terms of the structure of the damper member and the surrounding structure. In the two-way valve 90 according to the second embodiment, the same reference numerals and symbols are used for components identical or equal to those in the two-way valve 10 described above, and the detailed descriptions will be omitted.

A damper member 92 according to the second embodiment is configured as a coned-disk spring. An annular protrusion 93 is formed on the upper end surface of the inner tubular portion 38 of the bonnet 14, and a first tapered surface 94 is formed inside the annular protrusion 93. The first tapered surface 94 is inclined downward toward the inside. The damper member 92 is disposed inside the annular protrusion 93, and the outer peripheral edge of the damper member 92 engages with the stepped part between the annular protrusion 93 and the first tapered surface 94.

The damper member 92 is retained by a disk-shaped ring plate 95 secured to the upper end of the annular protrusion 93, whereby the damper member is prevented from dropping off the inner tubular portion. A second tapered surface 96 is formed on the lower surface of the inner circumference of the ring plate 95. The second tapered surface 96 is inclined upward toward the inside, and the angle of inclination is approximately equal to the angle of inclination of the first tapered surface 94. The damper member 92 can be deformed in the following two no-load states. In one of the states, the damper member 92 has a truncated cone shape in which the upper surface thereof is in contact with the second tapered surface 96 along the second tapered surface 96 (see FIG. 6). In the other state, the damper member 92 has an inverted truncated cone shape in which the lower surface thereof is in contact with the first tapered surface 94 along the first tapered surface 94 (see FIG. 7).

A plurality of projections 97 are disposed on the outer circumferential surface of the medium-diameter portion 68 of the piston 18 at regular intervals in the circumferential direction. For example, four projections 97 are disposed at intervals of 90°. The plurality of projections 97 can change the damper member 92 from the truncated cone shape into the inverted truncated cone shape by coming into contact with (pushing) the inner circumferential edge of the damper member 92 from above, and can reverse the damper member 92 from the inverted truncated cone shape to the truncated cone shape by coming into contact with (pushing) the inner circumferential edge of the damper member 92 from below.

Figure 8:
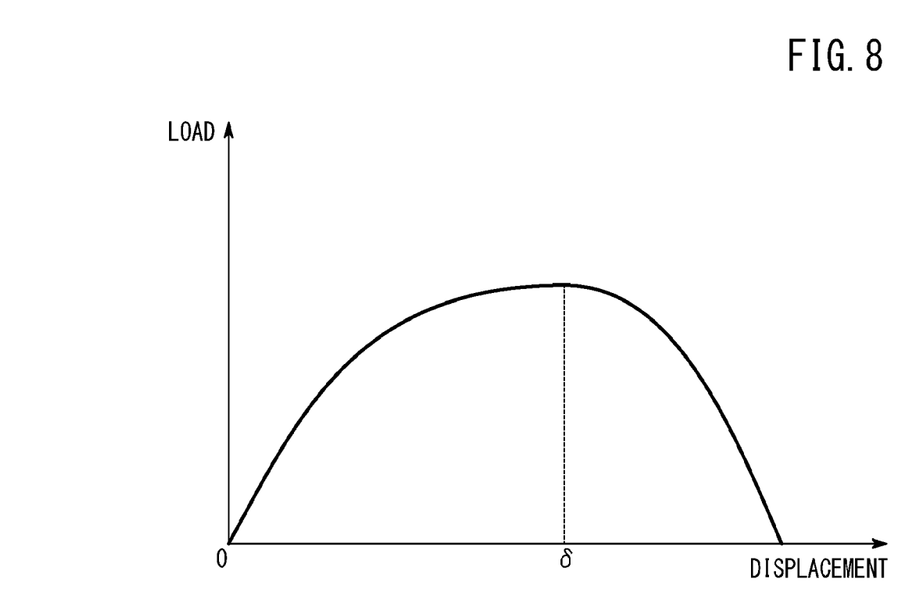
FIG. 8 illustrates a characteristic of a damper member regarding load applied thereto and the displacement thereof when a piston moves down in the two-way valve in FIG. 6.

FIG. 8 illustrates a characteristic of the damper member 92 regarding the load applied thereto and the displacement thereof when the piston 18 moves down. The vertical axis represents the magnitude of the force of the damper member 92 pushing back the piston 18 upward, and the horizontal axis represents the downward displacement of the piston 18 from the top dead center of the piston 18.

Figure 6:
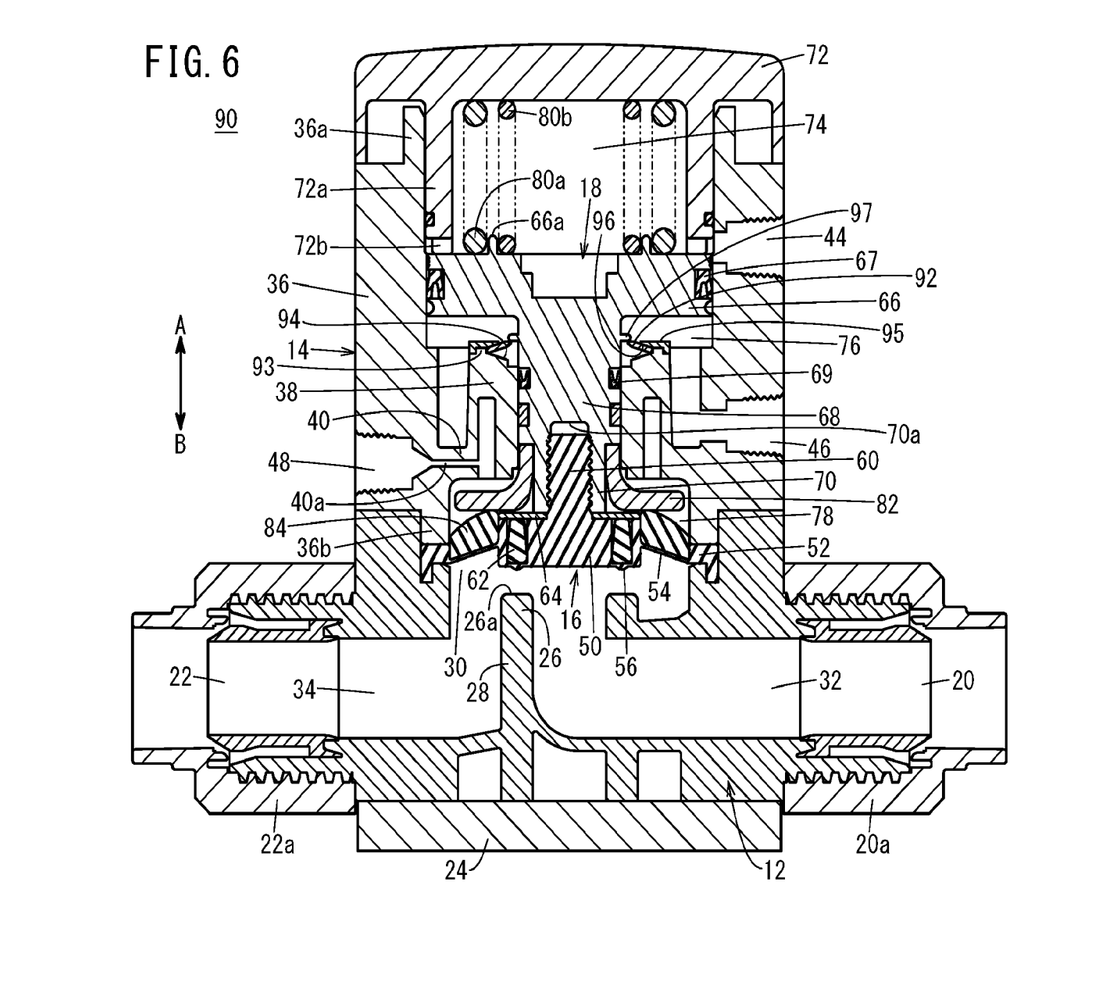
FIG. 6 is a longitudinal sectional view of a two-way valve according to a second embodiment of the present invention when the valve is open.
Figure 7:
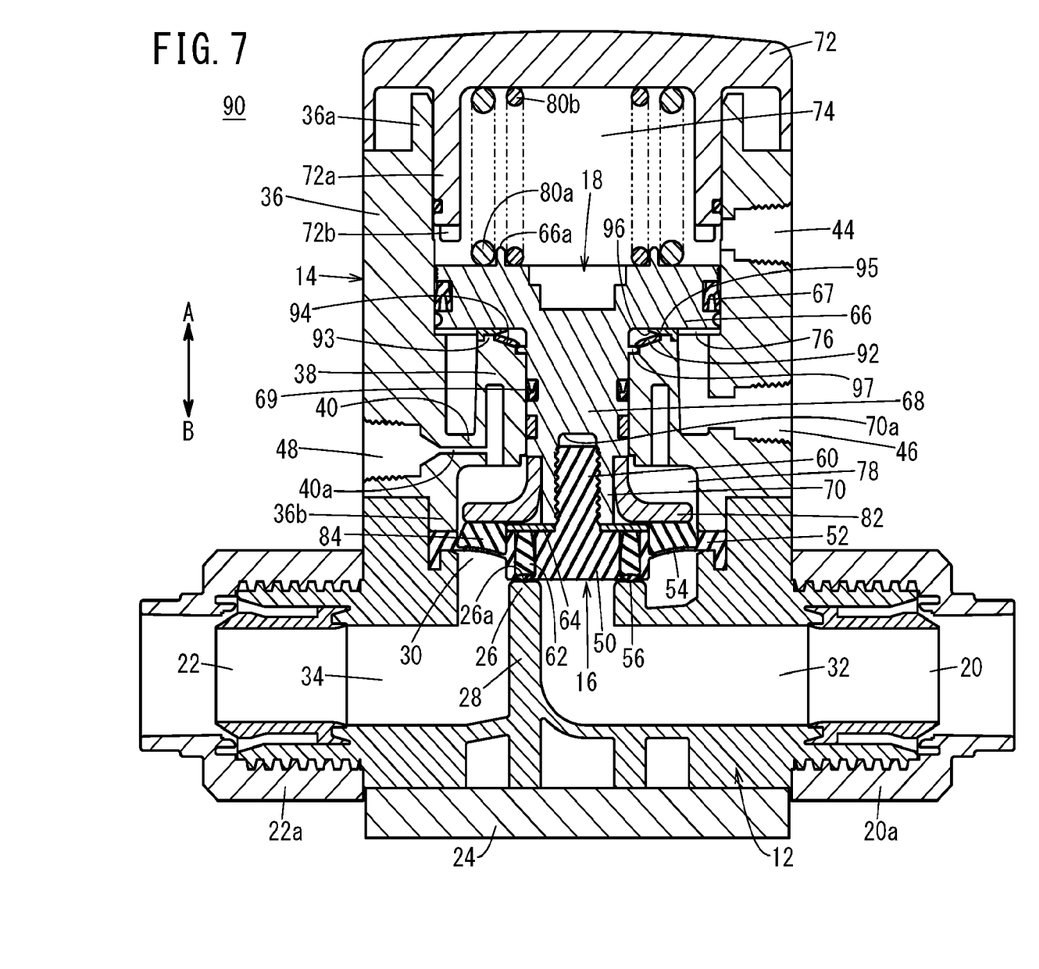
FIG. 7 is a longitudinal sectional view of the two-way valve in FIG. 6 when the valve is closed.

As illustrated in FIG. 6, when the valve is in an open state where the body portion 50 of the diaphragm valve 16 is at a position farthest from the valve seat portion 26, the upper surface of the damper member 92 is in contact with the second tapered surface 96 of the ring plate 95 along the second tapered surface 96, and the projections 97 of the piston 18 are located exactly above the inner circumferential edge of the damper member 92. When the pressurized fluid in the lower cylinder chamber 76 is discharged to the outside from this state, the piston 18 receives the elastic force of the coil springs 80a and 80b and is displaced downward.

In this case, since the projections 97 of the piston 18 push the inner circumferential edge of the damper member 92 downward, the piston 18 receives reaction force in a direction along which the piston 18 is pushed back upward from the damper member 92. As illustrated in FIG. 8, the reaction force has the maximum value when the displacement of the piston 18 is 6, that is, exactly when the annular projection 56 of the body portion 50 reaches (comes into contact with) the seat surface 26a of the valve seat portion 26. Thus, the piston 18 and the body portion 50 of the diaphragm valve 16 are sufficiently decelerated by the time when the displacement of the piston 18 reaches 8, and the annular projection 56 comes into abutment against the seat surface 26a at the reduced speed. This further prevents particle production.

When the displacement of the piston 18 exceeds 8, the damper member 92 is changed from the truncated cone shape into the inverted truncated cone shape, and the force of the damper member 92 pushing back the piston 18 disappears immediately. Thus, the entire elastic force of the coil springs 80a and 80b acts as the force pushing the annular projection 56 against the seat surface 26a. Consequently, high sealing performance can be achieved without setting the spring force of the coil springs 80a and 80b to be great.

Eventually, the projections 97 of the piston 18 get over the inner circumferential edge of the damper member 92 while deforming the damper member 92 having the inverted truncated cone shape such that the damper member 92 is pushed out and expanded from the inside. The piston 18 then reaches the bottom dead center when the projections 97 are located below the inner circumferential edge (see FIG. 7).

Subsequently, when pressurized fluid is supplied to the lower cylinder chamber 76, the piston 18 is displaced upward. This causes the projections 97 of the piston 18 to push the inner circumferential edge of the damper member 92 upward and to reverse the damper member 92 from the inverted truncated cone shape to the truncated cone shape. The projections 97 of the piston 18 get over the inner circumferential edge of the damper member 92 while deforming the damper member 92 having the truncated cone shape such that the damper member 92 is pushed out and expanded from the inside. The piston 18 reaches the top dead center when the projections 97 are located above the inner circumferential edge (see FIG. 6).

The projections 97 of the piston 18 can get over the inner circumferential edge of the damper member 92 having the truncated cone shape from below to above, but cannot get over the edge from above to below. Similarly, the projections 97 of the piston 18 can get over the inner circumferential edge of the damper member 92 having the inverted truncated cone shape from above to below, but cannot get over the edge from below to above.

In the above-described embodiments, the diaphragm valve 16 is closed by the elastic force of the coil springs 80a and 80b. However, the diaphragm valve 16 may be closed by supplying pressurized fluid to the upper cylinder chamber 74 instead of using spring members such as the coil springs 80a and 80b. In this case, the slits 72b formed in the tubular protrusion 72a of the cover body 72 serve as passages for the pressurized fluid. Moreover, the diaphragm valve 16 may be configured as a normally open valve wherein spring members are arranged in the lower cylinder chamber 76 and the diaphragm valve 16 is opened and closed by controlling the pressure inside the upper cylinder chamber 74. Furthermore, electrical means such as solenoid mechanisms may be used as the drive mechanism configured to displace the diaphragm valve.

In the above-described embodiments, the body portion 50 of the diaphragm valve 16 is provided with one annular projection 56. However, the body portion 50 of the diaphragm valve 16 may have two or more annular projections disposed concentrically. In this case, if fluid leakage occurs at one of the annular projections, another annular projection can prevent further leakage.

In the above-described embodiments, the hardness of the diaphragm valve 16 is lower than the hardness of the body part 12 including the valve seat portion 26. However, both the diaphragm valve 16 and the valve seat portion 26, for example, may be made of a fluororesin (e.g., PFA), which has a relatively high hardness, to have the same hardness.

Moreover, a cylindrical damper member made of, for example, synthetic rubber is used as the damper member in the first embodiment, and a coned-disk spring is used as the damper member in the second embodiment. However, the shape (type of spring) and the material of the damper member are not limited to the above.

The two-way valve according to the present invention is not limited in particular to the embodiments described above, and may take various forms without departing from the scope of the present invention as a matter of course.

What is claimed is:

1. A two-way valve configured to switch between a communication state and a non-communication state between a primary port and a secondary port, comprising:
   a valve body having the primary port and the secondary port and containing a valve seat portion therein, the valve seat portion comprising a planar seat surface;
   a diaphragm valve supported inside the valve body, wherein the diaphragm valve has an annular recess; and
   a drive mechanism configured to displace the diaphragm valve in a displacement direction such that the diaphragm valve is brought into contact with, and separated from, the valve seat portion;
   wherein the diaphragm valve includes an annular projection projecting in the displacement direction and facing the planar seat surface of the valve seat portion to be brought into contact with the planar seat surface, and a thin-walled part in a vicinity of the annular projection, whereby the annular projection is thicker in the displacement direction than is the thin-walled part; and an elastic member provided at a back of the annular projection and in the annular recess, the elastic member being provided to absorb an impact of the annular projection of the diaphragm valve being brought into contact with the planar seat surface of the valve seat portion.

2. The two-way valve according to claim 1, wherein:

the elastic member has a cylindrical shape, an outer circumferential surface and an inner circumferential surface of the elastic member comprise respective tapered surfaces inclined so as to be closer to each other with distance in the displacement direction from the annular projection; and a gap increasing with distance from the annular projection is left between a wall surface of the annular recess and the elastic member.

3. The two-way valve according to claim 1, further comprising an elastic support configured to be in surface contact with a diaphragm portion of the diaphragm valve and thereby restrict bending of the diaphragm portion.

4. The two-way valve according to claim 1, further comprising:

a plurality of said annular projections, which are disposed concentrically.

5. The two-way valve according to claim 1, wherein the planar seat surface extends in a direction perpendicular to the displacement direction.

6. The two-way valve according to claim 1, wherein the elastic member is aligned with the annular projection in the displacement direction.

7. The two-way valve according to claim 5, wherein the elastic member is aligned with the annular projection in the displacement direction.

8. The two-way valve according to claim 1, wherein the drive mechanism includes a piston connected to the diaphragm valve.

9. The two-way valve according to claim 8, wherein the valve body is provided with a damper configured to abut against the piston that moves in the displacement direction.

10. The two-way valve according to claim 9, wherein the damper member is a coned-disk spring.

11. The two-way valve according to claim 10, wherein force of the coned-disk spring pushing back the piston has a maximum value exactly when the annular projection reaches the seat surface.

* * * * *